Patented Dec. 1, 1953

2,661,357

UNITED STATES PATENT OFFICE 2,661,357

PRODUCTION OF 16-KETO-17-HYDROXY STEROIDS

Max N. Huffman, Oklahoma City, Okla., assignor to G. D. Searle & Co., Chicago, Ill., a corporation of Illinois No Drawing. Application September 9, 1950, Serial No. 184,128

2 Claims. (Cl. 260—397.4)

This invention relates to the manufacture of 16-keto-17-hydroxy steroids. More particularly this invention concern the production of estradiols having a functional carbonyl group in the 16-position and 3-ethers of the same.

This application is a continuation-in-part of my copending application Serial No. 1,058, filed January 29, 1948, now Patent No. 2,522,177, granted September 12, 1950.

I have discovered that 16,17-diketo steroids can be reduced to 16-keto-17-hydroxy steroids by reaction with zinc and an organic acid, or with titanous (trivalent titanium) salts. I have further found that this reduction reaction is particularly adapted to steroids wherein the phenolic hydroxyl group at the 3-position is protected by etherification.

It is the object of this invention to provide simple and economical methods for the production of 16-keto-17-hydroxy steroids. More particularly it is the object of this invention to produce and to provide methods for producing 3-alkyl and 3-aralkyl ethers of 16-keto-$\alpha$-estradiol, the methods having the characteristics of simplicity, good yield, and purity of product.

The products obtained by my methods may be represented by the following general structural formula

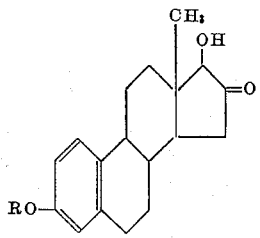

where R may be hydrogen, a lower alkyl radical such as methyl, ethyl, propyl, isopropyl, butyl, isobutyl, secondary butyl, and the like or aralkyl such as benzyl, naphthyl methyl, phenethyl and the like. As far as the steroid nucleus is concerned, rings A, B, and C may be saturated or unsaturated. In the estradiol derivatives ring A is benzenoid.

The reduction of the 16,17-diketo steroids to 16-keto-17-hydroxy steroids is generally carried out in an aqueous solution of a lower alkanoic acid, as for example in 50% aqueous acetic acid, at elevated temperatures, that is, the temperatures in the range of 50–150° C. over a period of time extending from a matter of 5 to 10 minutes to several hours. When zinc is a reagent, the concentration of alkanoic acid is preferably about 50% although concentrations in the range of 40 to 100% are operable. With titanous salts the concentration of alkanoic acid is higher, preferably 80–100%, since water is introduced with the titanium salt. The concentration of the alkanoic acid controls the amount of steroid which may be dissolved in the reaction mixture and therefore ranges of 50% or higher are preferred in order that practical quantities of the steroids may be employed. Among the alkanoic acids which can be used in my processes are formic, acetic, propionic, butyric, isobutyric, valeric and related acids of 1-6 carbon atoms. After the reduction reaction is completed the organic phases are separated, washed to remove impurities and evaporated to obtain the 16-keto-17-hydroxy steroid. The latter may be subsequently purified by recrystallization from organic solvents.

The natural estrogens have been widely used to supplement or replace the natural glandular secretions of hormones necessary in normal body functions. In order better to achieve their goal, many investigators have suggested and have synthesized derivatives of estrogens which are unlike the natural substances but which they believed capable or entering the body metabolism in a beneficial manner.

I have found, for example, that certain important benefits are derived, both chemically and biologically, when a functional carbonyl group is provided on the C16 position of the various estrogens, and especially ($\alpha$)-estradiol. Little is known of these derivative materials at the present time.

In an article entitled, "The Relative Estrogenic Activity of Compounds Related to Estriol," published in "Endrocrinology" by the applicant in conjunction with Grollman (vol. 41, No. 1, July, 1947), it is suggested that the possible pathway of the conversion of 16-keto-estrone to estriol in normal body metabolism is through intermediates in the form of 16-keto-($\alpha$)-estradiol. From this, it may be assumed that such intermediates may be more beneficially received and utilized for normal body metabolism in a manner not to interfere with the other body functions.

My invention is disclosed in detail by the following examples which are provided by way of illustration only and which are not to be construed as limiting it in spirit or scope.

EXAMPLE 1

*3-methyl ether of 16-keto-($\alpha$)-estradiol from 3-methyl ether of 16-keto-estrone*

100 mg. of the 3-methyl ether of 16-ketoestrone, about 10 cc. of 50% acetic acid, and 0.2 gram of zinc dust are heated together with stirring at about 90° C. During the course of the reaction, which may take about 40 minutes, small granules of zinc dust are occasionally added. When cooled, the fluids are rinsed from the zinc with ether or other suitable solvents and the ethereal solution treated successively with water, 3% sodium bisulfite or other alkali sulfites or bisulfites, 5% sodium carbonate, and additional portions of water. Upon evaporation of the solvent, crystals of the 3-methyl ether of 16-keto-($\alpha$)-estradiol are obtained. For purposes of purification, the crystals may be subsequently treated with charcoal and recrystallized from aqueous alcohol, such as methyl alcohol or ethyl alcohol.

EXAMPLE 2

*3-ethyl ether of 16-keto-($\alpha$)-estradiol from 3-ethyl ether-16-keto-estrone*

5 cc. of titanous chloride solution (20%) and 5 cc. of acetic acid are mixed on a steam bath for about 30 minutes with about 100 mg. of the 3-ethyl ether of 16-keto-estrone. The resulting purple solution is distributed between ether and water phases after cooling to room temperature. The orchid colored aqueous phase is separated and the ether phase is washed successively with water and dilute sodium carbonate. Upon evaporization of the ether, rosettes of glassy crystals of the 3-ethyl ether of 16-keto-($\alpha$)-estradiol are obtained. These crystals may be purified by treatment with charcoal and aqueous methyl alcohol and recrystallized from aqueous acetone, cyclohexane, and aqueous ethanol in successive steps.

I claim:

1. The method of manufacturing the 3-ethers of 16-keto-($\alpha$)-estradiol comprising reducing the corresponding 16,17-diketo-steroid by reaction in the presence of a titanous salt and an organic acid.

2. The method of manufacturing the 3-ethyl ether of 16-keto-($\alpha$)-estradiol comprising reducing the 3-ethyl ether of 16-keto-estrone with a titanous salt and acetic acid.

MAX N. HUFFMAN.

References Cited in the file of this patent

UNITED STATES PATENTS

| Number | Name | Date |
|---|---|---|
| 2,353,808 | Butenandt | July 18, 1944 |